(12) United States Patent
Mahlich

(10) Patent No.: US 8,707,856 B2
(45) Date of Patent: Apr. 29, 2014

(54) COFFEE/ESPRESSO MACHINE COMPRISING A MILK FOAM GENERATING DEVICE FOR CAPPUCCINO

(75) Inventor: Gotthard Mahlich, Kronberg (DE)

(73) Assignee: Eugster/Frismag AG, Amriswil (CH)

( * ) Notice: Subject to any disclaimer, the term of this patent is extended or adjusted under 35 U.S.C. 154(b) by 321 days.

(21) Appl. No.: 12/924,489

(22) Filed: Sep. 28, 2010

(65) Prior Publication Data

US 2011/0072977 A1    Mar. 31, 2011

(30) Foreign Application Priority Data

Sep. 29, 2009  (DE) .................... 20 2009 013 064 U

(51) Int. Cl.
*A47J 31/40* (2006.01)
*A47J 31/44* (2006.01)
*A47J 31/04* (2006.01)

(52) U.S. Cl.
USPC .................................. 99/280; 99/293; 99/294

(58) Field of Classification Search
USPC .................................... 99/280, 294, 300, 315
See application file for complete search history.

(56) References Cited

U.S. PATENT DOCUMENTS

| | | | |
|---|---|---|---|
| 5,549,036 A | 8/1996 | Hourizadeh | |
| 5,855,162 A * | 1/1999 | Bauer et al. | 99/290 |
| 7,484,454 B2 * | 2/2009 | Oehninger | 99/287 |
| 2007/0012193 A1 | 1/2007 | Oehninger | |

FOREIGN PATENT DOCUMENTS

| | | |
|---|---|---|
| DE | 10 2008 043 572 | 5/2010 |
| EP | 0 480 928 | 6/1994 |
| EP | 0 820 715 | 12/1998 |
| WO | WO 01/74211 | 10/2001 |

* cited by examiner

*Primary Examiner* — Tu B Hoang
*Assistant Examiner* — Lindsey C Teaters
(74) *Attorney, Agent, or Firm* — DLA Piper LLP (US)

(57) ABSTRACT

A coffee/espresso machine having a milk froth generating device for cappuccino and including at least one outflow tube fluid-conductively connected with an espresso supply. The espresso supply is connected to an outlet of an espresso brewing unit, and at least one milk froth tube is connected to the milk froth generating device. At least one milk froth tube leads into an upper end of the outflow tube.

3 Claims, 1 Drawing Sheet

Section A-A

COFFEE/ESPRESSO MACHINE COMPRISING A MILK FOAM GENERATING DEVICE FOR CAPPUCCINO

BACKGROUND OF THE INVENTION

1. Field of the Invention

The present invention relates to a coffee/espresso machine comprising a milk foam generating device for cappuccino.

2. Description of the Related Art

In order to prepare cappuccino, it is desirable to design the coffee/espresso machine in such a way that on a depositing area, one cup or two cups as the collecting vessel(s) need not be repositioned when milk foam and espresso is being filled in. This simplifies and shortens the cappuccino preparing process.

For this purpose, it has been known to provide one outflow tube each for milk foam and for espresso tightly one next to the other (EP-A-0 480 928). For preparing espresso, milk foam and espresso are dispensed by this coffee/espresso machine preferably simultaneously to prepare the cappuccino within a short period of time. On the other hand, the coffee/espresso machine might instead so be adjusted that, depending on personal choice, milk foam may be dispensed either prior to or after the apportionment of espresso.—In the case of this coffee/espresso machine, however, the design of the structurally completely separated outflows and the distance thereof complicates the positioning of the cup so that the possibility of misdirecting of one of the cappuccino constituents and a danger of soiling caused thereby cannot be excluded. The cleaning of the two separate outflows is, moreover, complicated. If for each of the two outflows a rinsing duct each were provided, the structural elaboration would be significant.

In order to structurally simplify to the best a coffee/espresso machine of the kind referred to in the beginning as far as possible and to improve it as to its function, its operation and the possibility of the cleaning, it has already been known to structurally combine the coffee outflow and a milk outflow to make it one dispensing outflow unit in which the coffee outflow and the milk outflow are arranged coaxially relative to each other so that the milk outflow encircles the coffee outflow (EP 0 820 715 B1). In particular, the coffee outflow may lead into the open below the milk outflow. In this way, keeping clean of the machine should be simplified since the lower disposition of the exit of the coffee outflow avoids that it is will be clogged by milk residues. Milk remaining back in the milk outflow, however, might clog together, particularly if bars extend in the milk outflow up to a wall of the coffee outflow in order to reduce or avoid, as guide vanes, twisting of the milk and hence spilling of the milk or the milk foam. In a coffee/espresso machine having a double outflow, two coaxial arrangements each of the coffee outflow and the milk outflow may be combined together and to be connected via a distribution chamber including an espresso inflow while the foamed-up milk is separately added to the two coaxial arrangements.

If the above coffee/espresso machine, as commonly preferred, is operated so that for cappuccino preparation, first coffee/espresso flows out through the coffee outflow and subsequently milk foam through the outer coaxial milk foam outflow, the disadvantage is particularly imminent that at least part of the milk residues remaining in the milk foam outflow will cake on the coffee outflow tube during the course of the subsequent coffee/espresso outlet process and thus by the heating of the coffee outflow tube, and can only with difficulties be removed by a rinsing process.

BRIEF SUMMARY OF THE INVENTION

It is an object of the present invention to design, in a coffee/espresso machine, the means for passing milk foam and espresso into a collection vessel in a manner so that they can be handled still easier and safer and their cleaning is simplified after cappuccino preparation where first the milk foam is discharged and subsequently the coffee/espresso is discharged. For the cappuccino preparation, in any case, a less exact positioning of a cup, or of a collection vessel should be sufficient to pass espresso and milk foam into the cup, or the collection vessel, without any lateral misdirecting.

This task is solved for a coffee/espresso machine by comprising a milk foam generating device for cappuccino and at least one outflow tube which is connected fluid-conductingly with an espresso supply, wherein the espresso supply is connected to an outlet of an espresso brewing unit, and at least one milk foam duct is connected to the milk foaming device, and in the present invention, the at least one milk foam duct leads into an upper end of the at least one outflow tube.

The design of the means by which the constituents of a cappuccino, namely espresso and milk foam, are supplied in a collection vessel, particularly a cup, are substantially simplified in that the milk foam duct leads into an upper end of a common outflow duct the clear cross section of which is not constricted by a central espresso outflow. Rather, in the coffee/espresso machine according to the invention, the complete clear cross section of the common outflow tube is available for milk foam outflow and espresso outflow each.

The clear cross section in the common outflow tube may be restricted only in a lower end section by a centering rod concentrically extending into it in order to smooth and to center the discharge of the milk flow into the collection vessel below the outflow path formed by the common outflow tube.

The arrangement according to the invention of the milk foam duct leading into an upper end of the outflow tube which in this place is also in fluid-conducting connected with the espresso inflow in a fluid conducting manner, is particularly advantageous in connection with a control of the sequence of the activation of the espresso brewing unit and the milk foam generation device so that, automatically, first the milk foam generation device and subsequently the espresso brewing unit is activated. For cappuccino preparation, therefore, first milk foam and subsequently espresso flows through the outflow tube so that subsequent to the milk foam outflow milk foam residues which remained initially in the common outflow tube are extensively washed out without difficulties by the subsequent espresso outflow. In a further subsequent rinsing process with water, only the remained espresso residues need to be washed out of the common outflow tube. The water used for rinsing the common outflow tube may be supplied to the common outflow tube via a single rinsing duct which leads into the upper end of the outflow tube.

In a simplest coffee/espresso machine having one milk foam generation device for cappuccino, there is provided only one single outflow tube into the upper end of which leads a milk foam duct.

For the preparation of espresso in two cups, or collection vessels, the coffee/espresso machine may instead also include an outflow distributor having two outflow tubes, wherein the outflow distributor is fluid-conductively connected with the espresso inflow, and two milk foam ducts which are connected, separately from each other, to at least one milk foam generating device, one of which two milk foam ducts each leads into one upper end each of one of the two outflow tubes.

In the variant of the coffee/espresso machine including one outflow distributor having two outflow tubes, the outflow distributor is shaped structurally simple but efficient for the outflow distribution of the espresso, showing the features that from the ends of one espresso distributor tube of the outflow distributor one outflow tube each is disposed at right angles downward and is open below, and that, above, one of the milk foam ducts each leads into one of the outflow tubes each. For the distribution effect, the espresso distributor tube is substantially disposed horizontally but may, if necessary, extend from the central espresso inflow, inclined about an acute angle relative to the horizontal, downward to the upper ends of the outflow tubes.

BRIEF DESCRIPTION OF THE SEVERAL VIEWS OF THE DRAWINGS

In the following, a simple embodiment of the milk foam generating device for cappuccino of a coffee/espresso machine including an outflow distributor will be described referring to a drawing including two figures from which further advantageous features of the invention may be apparent. In the figures.

DETAILED DESCRIPTION OF THE INVENTION

Figure 1:
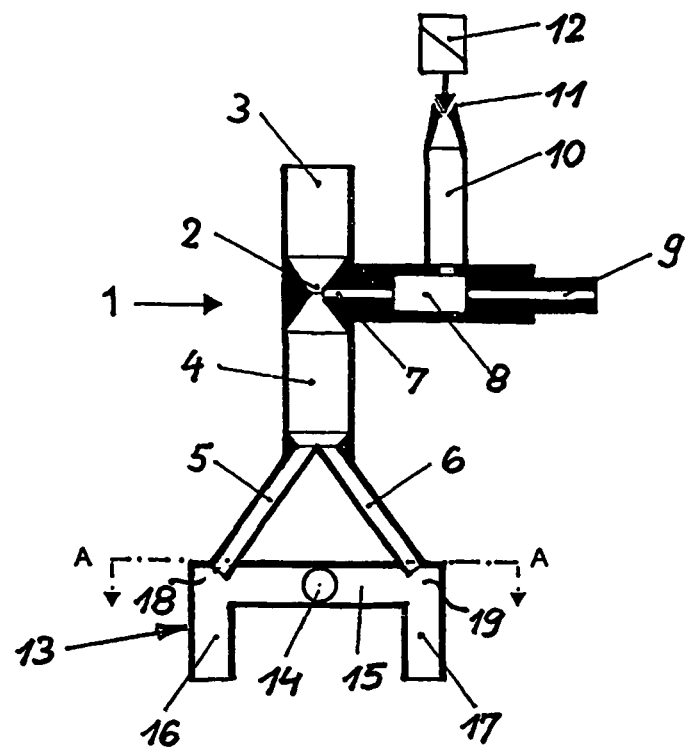
FIG. 1 shows a longitudinal section through the milk foam generation device including an outflow distributor in a diagrammatic representation.
Figure 2:
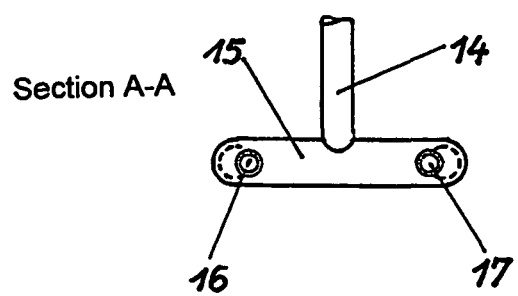
FIG. 2 shows a cross section through the outflow distributor in the sectional plane A-A of FIG. 1.

In FIG. 1, reference numeral 1 refers to a milk foam generation device including a Venturi tube 2. The Venturi tube 2 is disposed in the flow channel between a vapor supply 3 and a foaming chamber 4 from the bottom of which two milk foam ducts 5 and 6 lead out. To the Venturi tube 4 leads a milk-air mixture duct 7 which is connected with a milk-air premixing chamber 8. The milk-air premixing chamber 8 is connected with a milk supply duct 9, on one hand and, via a not-designated opening, with an air duct 10, on the other, which can be closed by an air valve 11 by means of an air valve gear 12 so that, if required, the Venturi tube 2 will not be supplied a milk-air premix but rather milk only.

An outflow distributor, generally referred to by numeral 13, is connected via the milk foam ducts 5 and 6 with the foaming chamber, on one side, and via an espresso supply 14 with an espresso brewing unit, not shown, on the other.

The espresso supply 14 is disposed in the center of a horizontal espresso distributor tube 15 at the two ends of which one outflow tube 16, or 17, each is arranged vertically at an angle downward which is open at the downward end above a common depositing area for cups and the like, not shown. The milk foam ducts 5, 6 each lead into an upper end 18, or 19, of the outflow tube 16, or 17, which in this way constitutes a common outflow tube 16, or 17, successively for the milk foam which flows from the milk foam duct 5, or 6, and the espresso distributing in the espresso distributor tube 15.

Into the end sections not designated of the outflow tubes 16, 17 of this embodiment, centering rods 20, 21 extend concentrically which are held, in these end sections, by radial bars not designated.

The function of the milk foam generating device consists substantially in that by vapor flowing into the vapor supply 3, a milk-air mixture or, if air valve 11 is closed, milk is sucked into the Venturi tube 2 and is processed in the foaming chamber to become milk foam or heated milk. Subsequently, the milk foam or the heated milk flows, as mentioned above, through the milk foam ducts 5, 6 in equal parts into the outflow tubes 16, 17, preferably before espresso is fed via the espresso supply 14 in the distributor tube 15 and is distributed into the outflow tubes 16, 17.

The invention claimed is:

1. A coffee/espresso machine comprising:
a milk foam generating device for cappuccino; and
an outflow distributor comprising a horizontal espresso distributor tube and two outflow tubes, wherein
an espresso supply is connected to an outlet of an espresso brewing unit,
two milk foam ducts are connected to said milk foam generating device which is provided outside the outflow distributor,
the outflow distributor is fluid-conductively connected with the espresso supply,
from each end of the horizontal espresso distributor tube, one of the two outflow tubes is provided downwardly bent and open at a bottom end, and
the two milk foam ducts open into upper ends of the two outflow tubes.

2. The coffee/espresso machine according to claim 1, wherein a control of an automatic sequence of activating said espresso brewing unit and said milk foam generating device is designed so that, first, said milk foam generating device and, subsequently, said espresso brewing unit can be activated.

3. The coffee/espresso machine according to claim 1, wherein a centering rod extends centrically into a lower end section of each of said two outflow tubes.

* * * * *